2 Sheets—Sheet 1.
L. S. GARDNER.
RAILWAY SURFACE STOCK GUARD.
No. 11,338. Reissued May 16, 1893.
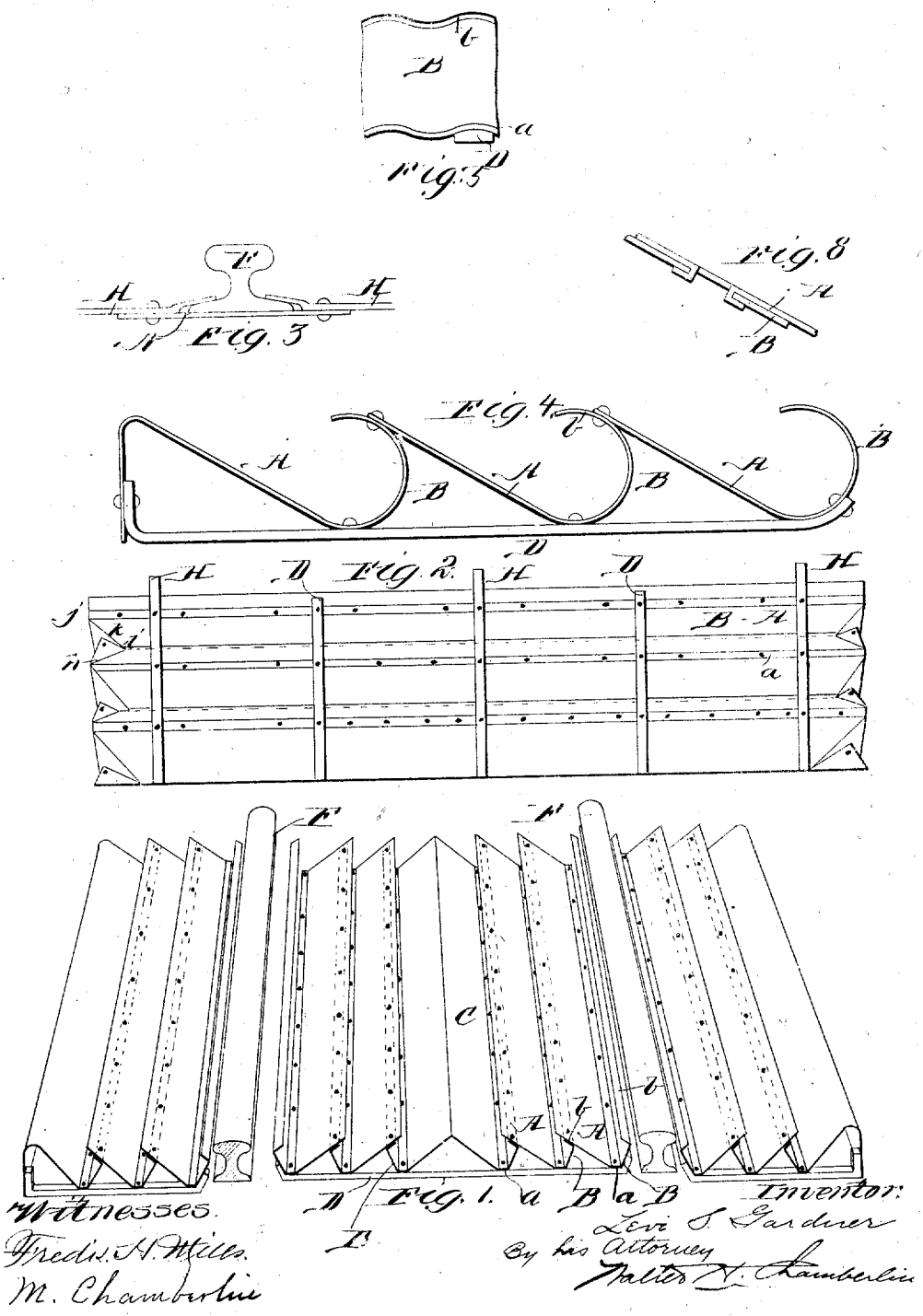

2 Sheets—Sheet 2.

L. S. GARDNER.

RAILWAY SURFACE STOCK GUARD.

No. 11,338. Reissued May 16, 1893.

Witnesses.

Fredk. H. Miles.

M. Chamberlin.

Inventor.

Levi S. Gardner

By his Attorney

Walter H. Chamberlin

UNITED STATES PATENT OFFICE.

LEVI S. GARDNER, OF DETROIT, MICHIGAN, ASSIGNOR, BY MESNE ASSIGNMENTS, TO BENJAMIN WOLHAUPTER, OF CHICAGO, ILLINOIS.

RAILWAY SURFACE STOCK-GUARD.

SPECIFICATION forming part of Reissued Letters Patent No. 11,338, dated May 16, 1893.

Original No. 472,574, dated April 12, 1892. Application for reissue filed June 15, 1892. Serial No. 436,869.

*To all whom it may concern:*

Be it known that I, LEVI S. GARDNER, of Detroit, in the county of Wayne and State of Michigan, have invented a new and useful Improvement in Railway Surface Stock-Guards, of which the following is a specification.

My invention relates to railroad surface stock-guards; and it consists in the improvements hereinafter described and claimed.

Figure 6:
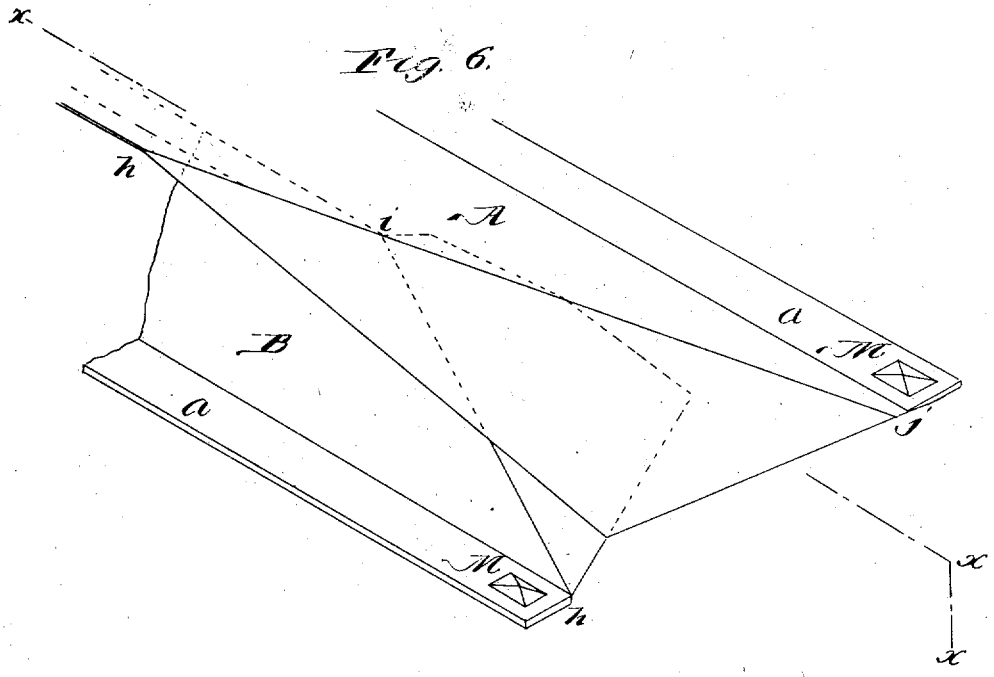
Figure 7:
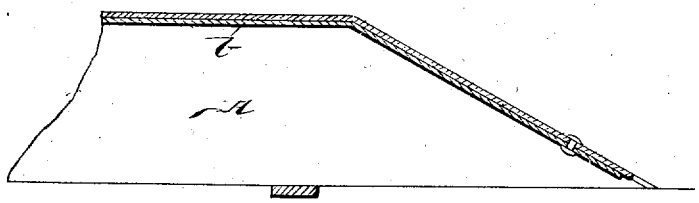

Referring to the accompanying drawings, Figure 1 is a perspective view of a stock-guard embodying my invention with the ends cut away to show its construction more distinctly. Fig. 2 is a bottom plan view of one of the sections of which said stock-guard is composed. Fig. 3 is a detail view in elevation showing the method of securing the guard to the rail. Fig. 4 is an end elevation of one of the sections, showing a modified form of construction. Fig. 5 is a detail view showing the construction of the device when corrugated sheet metal is used. Fig. 6 is an isometric view illustrating the method of forming and securing the ends. Fig. 7 is a section on the line $x$—$x$, Fig. 6. Fig. 8 is a detail view illustrating an alternative method of securing the parts together.

Similar letters refer to similar parts throughout the several views.

A B is a strip of sheet metal about nine feet long, bent so that its cross-section has the general form of the letter L. The flange A, forming the longer leg of the letter L in cross-section, and the flange B, forming the shorter leg, extend at right angles to each other, and a flange $b$ is turned up at the end of the flange B to extend in a direction parallel to the flange A. The flanges A B are united by a portion $a$, extending in a direction which forms an angle of about thirty degrees with the flange A and about sixty degrees with the flange B. To form the guard a number of these strips are united together, their lengths extending in parallel directions. The flange A of one strip is placed upon the flange $b$ of the next strip, so as to overlap and extend a short distance beyond the flange $b$, and is riveted in this position either by rivets in the ordinary way or by striking lugs out of one flange, extending them through holes in the other flange, and clinching them, as shown in Fig. 8.

When it is desired to form the portion of the guard which lies between the rails F F of one piece, the middle strip C is formed so that in cross-section it has the form of two letters L, the longer legs of which are united at their ends, so as to extend in directions which form an angle of about one hundred and twenty degrees with each other, as shown in Fig. 1. I prefer, however, for convenience in handling, to form the guard in sections having a width equal to about one-half the distance between the rails, so that the entire space to be guarded will be occupied by one section placed upon each side of the track and two sections between the rails. When thus constructed in sections, that one of the sheet-metal strips of which the guard is composed which is at that side of the section at which the flange A comes upon the outside, has said flange extended and bent downward into a vertical position, as shown in Fig. 1, in the sections outside the rails. That side of the sections at which the flange B comes at the outside should be placed next to the rails.

D is a metal rod passing under the strips A B $a$ $b$, of which the guard is composed, turned up at the ends, and bolted to the outside flanges of the guard and riveted between the ends of the portions $a$ of said strips.

H are metal rods similar to the metal rods D and similarly fastened, except that the ends which come toward the rails when the guard is in position are not bent up or bolted to the guard. Holes are formed through the portions $a$ of the strips of which the guard is composed to allow rain-water to escape.

In order that brake-chains, hooks, or other things depending from a passing train may not catch upon the guard, the ends of the strips A B $a$ $b$ are turned down, as shown in Fig. 6, so as to present a surface sloping in the direction of the length of said strips. The corner of the flange B is turned down along the line $h$ $i$. The corner of the adjacent flange A is then turned down along the line $j$ $k$ upon the turned-down corner of the flange B and riveted thereto.

The ends of the sections of the guard may be secured in place by driving spikes M M through the portions $a$ of the strips A B $a$ $b$ into the ties.

I secure the sections of the guard to the rails by placing the unsecured ends of the metal rods H above the lower flanges of the rails and uniting the end of the rod H upon the outside section of the guard, with the end of the corresponding rod upon the inside section, by a rod N, which passes under the rail and is riveted to each of said rods H H, as shown in Fig. 3.

In localities where the stock-guard will be subjected to very hard usage I form my improved guard of corrugated sheet metal. In this case the strips A B *a b* will have the same general form as that above described, but will be bent into curved lines, as shown in Fig. 4, so that its cross-section will have rather the form of a letter J than of a letter L, and the flange B will extend beyond the flange A of the adjacent strip. When corrugated metal is used, the upper surface of the rods D H will be curved in cross-section to fit into the corrugations of the strips, as shown in Fig. 5.

The operation of the above-described device is as follows: Should an animal attempt to cross the guard it would place its hoof upon the inclined flange A and the inclination of the flange would cause the animal's hoof to slide downward, thus bringing its leg forcibly against the narrow projecting edge of the adjacent flange A, or, where the form shown in Fig. 4 is used, against the edge of the flange B, thus causing the animal to draw back.

It will be observed by reference to the above description and to the drawings that when the guard rails or bars are riveted together as shown they form practically a continuous metallic surface. Take for instance the construction shown in Fig. 1, the portion between the track rails is practically one continuous sheet of metal since there are several pieces of metal rigidly connected together by rivets to form a continuous body. Thus an exceedingly strong and durable guard is obtained.

What I claim is—

1. A railway surface stock-guard consisting of a series of guard rails arranged substantially parallel with and adjacent to each other, a portion of each guard rail acting as a support for the adjacent rail, substantially as described.

2. A railway cattle guard consisting of a series of inclined guard rails arranged substantially parallel with and adjacent to each other, the upwardly projecting flange of each rail bearing on and being supported by the adjacent rail, substantially as described.

3. A railway cattle guard consisting of a series of guard rails each having two upwardly projecting flanges, one wider than the other, the narrower flange of each rail acting as a support for the wider flange of the adjacent rail, substantially as described.

4. A railway cattle guard consisting of a series of guard rails, each having two upwardly projecting and inclined flanges, one being wider than the other, the wider one of each rail bearing against and being supported by the narrower flange of the adjacent rail, substantially as described.

5. A railway cattle guard consisting of a series of guard rails, having a bottom portion and two upwardly projecting flanges, said bottom portion provided with a series of orifices, substantially as described.

6. A railway cattle guard consisting of a series of guard rails arranged in the form of a grating, said rails formed of metal, and having two upwardly projecting flanges, the edge of one flange overhanging the side of the other flange of the same rail, substantially as described.

7. A railway cattle guard consisting of a series of guard rails arranged parallel with and adjacent to each other, said rails bent substantially to the form in cross-section of the letter J, whereby each rail presents two upwardly projecting edges, substantially as described.

8. A railway cattle guard consisting of a series of guard rails arranged parallel with and adjacent to each other in the form of a grating, said rails bent substantially to the form in cross-section to the letter J, the wider flange of each rail being supported by the narrower flange of the adjacent rail, substantially as described.

9. A railway cattle guard consisting of a series of guard rails arranged parallel with and adjacent to each other in the form of a grating, said rails composed of corrugated metal, the corrugations having their surfaces rounded and extending transversely of the rail, substantially as described.

10. A railway cattle guard consisting of a series of guard rails formed of corrugated metal the corrugations having rounded surfaces and extending transversely of the rail, said rail so shaped that a portion of each rail acts as a support for the adjacent rail, substantially as described.

11. A railway cattle guard formed of a series of guard rails arranged parallel with and adjacent to each other, the end of one flange of each guard rail being turned down and engaged to the turned down end of a flange on the adjacent rail, substantially as described.

12. A railway surface cattle guard consisting of a series of guard rails arranged parallel with each other, each guard rail provided with a flange wihch is engaged to the adjacent rail by upsetting the metal of one flange against the metal of the adjacent flange, substantially as described.

13. A railway surface stock guard consisting of sheet metal bent into ridges so that the upper corner of one ridge shall overhang the lower part of the adjacent side of the next ridge and having the general shape in cross section shown and the rods securing the lower portions of said ridges together, substantially as described.

14. A railway surface stock guard consisting of a number of strips of sheet metal A B *a b* bent so that their cross section has the general form shown, a flange A of one of said strips being secured to a flange B of the adjacent strip, and a rod uniting the ridges thus formed, substantially as shown and described.

15. A railway surface stock guard consisting of a number of strips of sheet metal A B *a b* bent so that their cross section shall have the general form shown, a flange A of one of said strips being secured to a flange B of the adjacent strip so that the edge of one of said flanges shall extend beyond the edge of the other of said strips, and a rod passing beneath and uniting the lower portions of the ridges thus formed, substantially as shown and described.

16. A railway surface stock guard formed of sheet metal, said guard having a series of inclined portions, the upper edge of each inclined portion bearing upon and being supported by a flange extending from the adjacent inclined portion, substantially as described.

In testimony whereof I sign this specification in the presence of two witnesses.

LEVI S. GARDNER.

Witnesses:

LEWIS F. PHISTER,
WILLIAM H. CAVELL.